W. A. McCALLUM.
HANGER FOR TROLLEY WIRES.
APPLICATION FILED MAY 19, 1910.
986,843.
Patented Mar. 14, 1911.
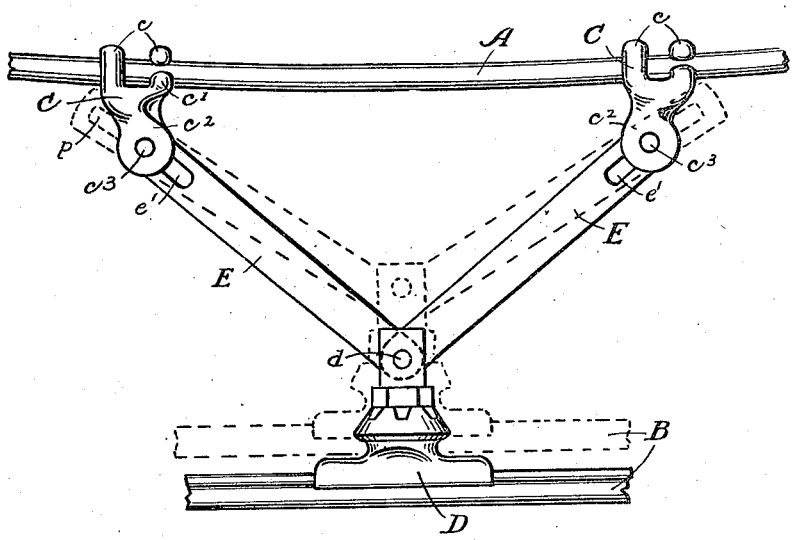
WITNESSES:
Walter A. Knight
A. L. Tildesley
INVENTOR.
William A. McCallum
BY
Lewis M. Hosea
ATTORNEY.

UNITED STATES PATENT OFFICE.

WILLIAM A. McCALLUM, OF CINCINNATI, OHIO.

HANGER FOR TROLLEY-WIRES.

986,843.  Specification of Letters Patent.  Patented Mar. 14, 1911.

Application filed May 19, 1910. Serial No. 562,149.

*To all whom it may concern:*

Be it known that I, WILLIAM A. MCCALLUM, a citizen of the United States, residing at Cincinnati, in the county of Hamilton and State of Ohio, have invented new and useful Improvements in Hangers for Trolley-Wires, of which the following is a specification.

My invention relates to systems of overhead suspension of the trolley wires of electric railways; and is in the nature of an improvement upon that system in which, from a messenger cable, hanging in catenary curves between its points of support, the trolley wire is suspended in parallel relations with the trackway.

In order to secure a more perfectly uniform yielding elasticity in relation to the upward thrust of the traveling conductor in the so-called catenary system, the suspension of the trolley wire at the successive lower bights of a "lacing" wire or cable interposed between the trolley wire and messenger cable in "zig zag" continuity, has been suggested, with manifest advantage because of the lessened and more uniform resistance to the upward thrust of the traveling conductor at the suspension points. The use of a substantially continuous "lacing" cable or wire, while offering substantial advantages, involves a difficulty both in adjusting and re-adjusting the relative depths of the suspension loops or bights with respect to the catenary curves of the messenger-cable; which may vary by reason of stretching or other more or less permanent conditions.

It is the primary object of my invention to provide a mode of suspending the trolley wire from a messenger cable that shall afford all the advantages to be derived from suspension by a substantially continuous "lacing" cable or wire, yet avoid the disadvantages thereof.

To this end, it consists in a V-shaped hanger of strips of metal, in which the vertical depth may be increased or decreased by adjusting the fastenings upon the messenger cable toward or from each other, or by lengthening or shortening the suspending arms of the hanger, when necessary, to re-adjust the "level" of the trolley wire; at the same time providing for the upward thrust of the traveling conductor by an independent yielding of the hanger arms as required by the "wave motion" of the trolley wire under the upward pressure of the traveling conductor.

My invention is shown in the accompanying drawing in side elevation attached to a messenger cable, exhibiting the trolley ear held by a common pivot to two adjacent flat links or strips of metal diverging to pivotal connections with adjustable fastenings upon the messenger cable.

In the accompanying drawings, A designates the messenger cable suspended upon and hanging in catenary curves between suitable supports and B designates the trolley wire hung from and vertically beneath the messenger cable by hangers varied in length to accommodate the curves of the messenger cable and maintain the trolley wire practically level and parallel with the track.

The traveling conductor upon a car being upheld against the trolley wire by spring tension, it is desirable and especially necessary where high speed of cars is required, that the trolley wire should possess some yielding elasticity upward under the spring pressure of the traveling conductor, in order that smooth running and uninterrupted contact may be at all times preserved between the traveling conductor and the conducting wire. This general object is best attained by suspending the trolley wire from the messenger cable upon short strips hung at their outer ends by fastenings, C, to the messenger cable, and allowed to "sag" between into a V-shaped bight carrying at its lowest point a suitable "ear" D, for holding the trolley wire B.

The fastening clips, C, consist of a pair of sister-hooks $c$, $c$, side by side, opening outward in opposite directions, each provided with a short tongue or projection $c^1$ below the hook, and extending correspondingly outward, and both hooks merged at the shank into a slotted base, $c^2$, through which from side to side is passed a bolt or pivot $c^3$. The fastening clip thus formed is made of malleable metal so that when placed upon the messenger cable, the tongues $c^1$ may be bent upward to clasp the messenger cable firmly between themselves and the hooks. For re-adjustment, the tongues may be pried slightly loose and again secured when the clip is shifted to its new position. Two clips are required for each hanger, the hanger being completed by attaching to each clip one end of relatively short strips of metal, E, extending into the slotted base, $c^2$, and held by a pivot, $c^3$, seated in and through the side walls of the slot. The pivot passes through a short longitudinal slot, $e^1$ in each of the strips, E; a construction allowing a longitudinal motion of the strips without impairment of the pivotal relation to the slotted base of the fastening clips, C. The trolley wire ear or clamp, D, is hung at the lower ends of the strips, E, in a slotted head of the ear or clamp upon a pivot, $d$, passing through the side walls of the clamp head and through the strips at the lower apex of the bight formed by the depending strips,—its weight keeping the divergent suspending strips of the hanger in normal position as shown in the drawing. The upward thrust of the traveling conductor lifts the trolley ear or clamp, causing the strips to be moved longitudinally upon the upper pivots, $c^3$, as allowed by the slots, $e^1$, into the positions indicated in the drawing by dotted lines. As thus constructed, the trolley wire, B, may be adjusted and maintained at a normal higher or lower level by setting the clips, C, nearer together or farther apart upon the messenger cable, A; while the temporary elevation of the trolley wire to accommodate the "wave motion" caused by the upward thrust of the traveling conductor is accomplished as above described.

The construction by which the strips are held at both ends in lateral contact between the side walls of the containing slots, while permitting the oscillating and longitudinal motion of the strips, prevents any buckling of the hanger sidewise and holds it in the vertical planes of the messenger cable.

The mode of operation has been sufficiently indicated in the foregoing description.

It will be manifest that the advantages of the invention can be realized to a greater or less degree in situations where a messenger cable is not used,—as in covered bridges, tunnels, etc., and such use I deem within the spirit of my invention.

I claim as my invention and desire to secure by Letters Patent of the United States:—

A hanger for trolley wires embodying in combination a trolley-ear, two flat strips of metal secured side by side by a common pivot to a trolley ear, as its suspending arms; and two fastenings or clips adapted to secure the said arms to a common overhead support, each arm being attached to its clip by a longitudinal slot engaging over a pivot or pin of the fastening permitting a longitudinal and a pivotal motion.

In testimony whereof I have hereunto set my hand in presence of two subscribing witnesses.

WILLIAM A. McCALLUM.

Witnesses:
LEWIS M. HOSEA,
WALTER A. KNIGHT.